United States Patent [19]

Plows et al.

[11] 4,075,974

[45] Feb. 28, 1978

[54] APPARATUS FOR DEPOSITING UNIFORM FILMS

[75] Inventors: Graham Stuart Plows, Cambridge; Paul Castle, Willingham, both of England

[73] Assignee: Decca Limited, London, England

[21] Appl. No.: 688,562

[22] Filed: May 21, 1976

Related U.S. Application Data

[62] Division of Ser. No. 586,632, June 13, 1975, abandoned.

[30] Foreign Application Priority Data

Jun. 17, 1974 United Kingdom ............... 26794/74

[51] Int. Cl.² ......................... B05C 5/00; B05C 11/08
[52] U.S. Cl. ........................................ 118/52; 118/64; 118/320
[58] Field of Search ................... 118/52, 54, 56, 320, 118/321, 64; 427/240, 241

[56] References Cited

U.S. PATENT DOCUMENTS

| | | | |
|---|---|---|---|
| 1,201,448 | 10/1916 | Edison | 118/321 |
| 2,580,131 | 12/1951 | Rowell | 118/52 X |
| 3,373,717 | 3/1968 | Morales | 118/52 X |
| 3,950,184 | 4/1976 | Adams et al. | 427/240 X |

FOREIGN PATENT DOCUMENTS 71-10790 3/1971 Japan ................................. 427/240

*Primary Examiner*—John P. McIntosh
*Attorney, Agent, or Firm*—Mawhinney & Mawhinney & Connors

[57] ABSTRACT

Apparatus for forming a uniform film on a planar surface of a planar support, particularly for forming thermoplastic films on conductive support members, comprises a drivable turntable having means for removably locating the planar support and having a distributor, mounted for rotation with it, a housing enclosing the turntable and the support, and a dispenser, located in the housing for delivering a charge of fluent material to the distributor. The distributor is arranged to distribute fluent material radially outwardly onto the planar surface of the planar support, and has at least one portion extending axially from the turntable. The dispensing means is located with its outlet over the distributor.

15 Claims, 4 Drawing Figures

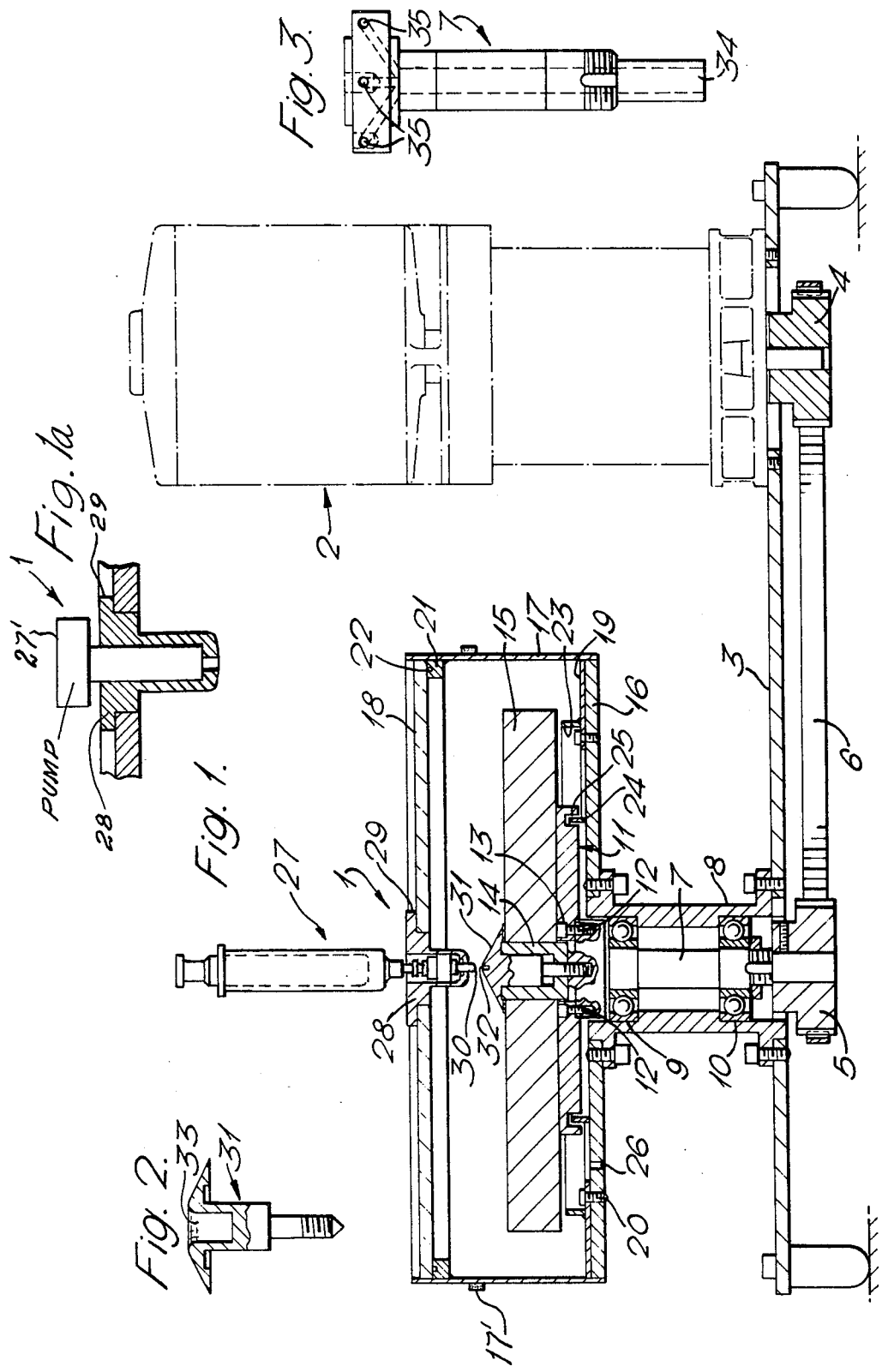

APPARATUS FOR DEPOSITING UNIFORM FILMS

This is a division of application Ser. No. 586,632 filed June 13, 1975 now abandoned.

This invention relates to apparatus for depositing uniform films particularly for the deposition of a uniform flat film of the thickness of the order of 10 microns on the surface of a relatively thick disc.

According to one aspect of the invention an apparatus for forming a uniform film on a planar support comprising a drivable turntable, means for removably locating a planar support on the turntable with the planar surfaces of the support normal to the axis of rotation of the turntable, a distributor mounted for rotation with the turntable at least part of which extends axially from the turntable, the distributor being adapted to distribute fluent material radially outwardly onto the upper of the planar surfaces of the support, an enclosure enclosing the turntable and the support, a dispenser for delivering a charge of fluent material to the distributor, and means for locating the dispenser in the enclosure so that the dispensing outlet of the dispenser is located over the distributor.

That part of the distributor which extends axially from the turntable may be formed as a cone, the apex of which is axially spaced from the turntable. Alternatively it may be formed with a frusto-conical face and a central reservoir for receiving fluent material.

The distributor may be releasably mounted on the turntable and it may be dimensioned to restrain the planar support from axial movement away from the turntable, when the distributor is mounted on the turntable.

In the preferred embodiment the enclosure is formed by an optically transmissive top, a base and a side wall section.

In the preferred embodiment the means for locating the dispenser is located in the top of the enclosure.

The turntable may have an annular groove formed in its base. There may be provided a first upstanding annular flange secured to the base of the enclosure coaxially with the turntable and having a diameter greater than the diameter of the turntable, a second upstanding annular flange secured to the base of the enclosure and arranged to lie within, but not in contact with, said groove, and a series of bleed holes passing through the base of the enclosure and being disposed between the flanges.

Means for causing gaseous material to flow through the enclosure may be provided and may comprise an inlet passage formed in the body of a spindle for the turntable and outlet passage.

Means for heating the gaseous material may be provided and may comprise, a flexible heater tape secured on the outside of the enclosure.

The turntable may be driven by a motor through a magnetic clutch.

According to an aspect of the invention there is provided a method of forming a uniform film on a planar support located on a turntable comprising depositing a charge of fluent material on to a distributor which is surrounded by a planar support, rotating the support on the turntable, the axis of rotation of which passes through the distributor, in order to distribute the fluent material as a film over the support, subsequently rotating the support as before but at a substantially higher speed in order to throw off from the support material excess to the thickness of film required and allowing the thinner film to settle.

The method may further comprise the steps of allowing the deposited material to settle on the support intermediate the steps of rotating and subsequently rotating.

The support may be slowly rotated during the steps of allowing the deposited material to settle.

The method may be performed in a dust-free environment. In the case where the fluent material comprises a solute dissolved in a solvent, the method may be performed in a saturated atmosphere.

According to a further aspect of the invention there is provided a method of making a film of thermoplastic material of the order of ten microns thick on a flat surface of a conductive disc, comprising the steps of:

(a) disposing the conductive disc on a turntable in a substantially dust free enclosure;
 (b) admitting a charge of solvent of a thermoplastic material to produce a saturated atmosphere in the enclosure;
 (c) depositing over the central region of the disc a fluent charge of thermoplastic material in the solvent;
 (d) rotating the disc about its principal axis so as to cause the fluent charge to flow over the upper surface of the disc;
 (e) rotating the disc at a higher speed to throw off material surplus to the required thickness; and
 (f) allowing the film to settle.

Reference will hereinafter be made to the accompanying drawings, in which:

FIG. 1 illustrates an apparatus for depositing thin films on a disc;

FIG. 1a is a fragmentary elevational view of FIG. 1 but showing a pump;

FIG. 2 illustrates an alternative form of distributor for use with the apparatus of FIG. 1; and FIG. 3 illustrates a spindle for use with the apparatus of FIG. 1.

In FIG. 1 the apparatus for depositing thin films is constituted by a spinner 1 and a drive unit 2 which are mounted on the raised base plate 3. The drive unit 2 is connected to the spinner 1 by means of the light duty toothed pulleys 4 and 5 and toothed belt 6. The drive unit 2 may consist of a single phase constant velocity induction motor, and a magnetic clutch unit.

A spindle 7, which is drivingly connected to toothed wheels, rotates at a speed proportional to the degree of excitation of the magnetic clutch. The range of rotational speeds which can be imparted to the spinner 1 may be varied by varying the respective diameters of the pulleys 4 and 5 and the length of the belt 6.

The spindle 7 is mounted in bearing housing 8 and supported by deep groove ball bearings 9 and 10. The bearings, 9 and 10, are mounted so as to have an angular contact configuration under a slight compressive load. The pulley 5 is mounted on the lower end of the spindle.

A cylindrical turntable 11 is secured to the upper end of the spindle 7 by screws 12. A circular recess 13 is provided at the centre of the turntable 11 to receive the disc centre boss 14. The boss 14 being arranged to laterally restrain a planar support, in this case a disc 15, on the turntable 11. The disc 15 may be constituted by any planar support, which is arranged to be located on the turntable 11.

The turntable 11 is surrounded by an enclosure 15 comprising, a base 16, an annular side wall 17, and a top 18. The base 16 is annular in shape and has an outside diameter 50 mm larger than that of the disc. The base 16 is coaxially mounted on the bearing housing 8. The side wall 17 is fabricated from sheet steel and has an internal flange 19, which locates the side wall 17 with respect to the base 16. The flange 19 is secured to the base by screws 20. A paper gasket (not shown) may be fitted between the flange 19 and the base 16 to ensure a gas tight seal at the interface. An annular ring 21, which is welded to the side wall 17, supports the top 18 which may be optically transmissive. The annular ring 21 has an annular groove 22 which contains an oil ring cord to effect a seal between the top 18 and the side wall 17. The locating flange 19 has an annular upright flange 23 mounted on its upper surface. A second annular flange 24 is mounted on the base and is arranged to lie within but not in contact with an annular groove 25 formed in the base of the turntable. A series of bleed holes 26 which pass through the base of the enclosure, are disposed between the flanges.

A filtering syringe 27 is coaxially mounted in the top 18 by means of a metal adaptor 28 formed as a flanged ring and located in an aperture 29 in the lid 18. The adaptor 28 is dimensioned to position the output 30 of the syringe 27 a small distance above a conical distributor 31. The conical distributor 31 is detachably mounted to the spindle 7 and is a sliding fit in the boss 14. The apex of the cone formed by the top of the distributor 31 has a slot 32 for receiving a screw driver blade. An alternative form of distributor 31 is shown in FIG. 2 and has a frusto conical face and a central recess 33 for receiving the probe.

The embodiment of the spindle 7 shown in FIG. 3 has an axial conduit, 34, open to the air, which connects equi-spaced radial holes 35 positioned around the head of the spindle.

A pump 27; as shown in FIG. 1a may be connected to the aperture so that air may be drawn through the spindle conduit 34, holes 35, and bleed holes 26 over the surface of the disc, to the pump inlet at aperture 29.

A heater 17′, in the form of a flexible heater tape, is placed around the outside of the side walls, and lagged to minimise heat losses. The heater is connected to a thermostat (not shown) which acts as a safety cutout and supplied by a variable power supply. The power supply is varied to maintain a constant temperature. A thermometer or thermocouple (not shown) may be mounted above the surface of the disc 15 in a holder (not shown) secured to the enclosure wall.

In operation the material, from which the film is to be formed, is dissolved in a solvent. For example polystyrene dissolved in iso-octane.

The disc 15 is then positioned on the turntable 11 and the distributor 31 tightened to secure the disc 15 to the turntable 11. The thermometer is then positioned at the top of the enclosure 18.

The enclosure top 18 is then placed in position, and the adapter 28 located in aperture 29. A quantity of solvent is admitted to the enclosure to produce a saturated atmosphere. The syringe 27 is then charged with a suitable quantity of the fluent material and the filled syringe 27 is located in the adapter 28.

The disc 15 is then rotated slowly and fluent material is slowly expressed from the syringe onto the distributor 31 which disperses the fluent material radially over surface of disc 15. When the fluent material has been expressed the rotation of the disc 18 is halted for a period of five minutes to permit the solution to distribute itself uniformly over the disc surface. During this settling period the syringe 27 and adapter 28 are removed and the pump 27′ which is preferably a peristaltic pump, is connected to the enclosure via aperture 29.

At the end of the settling period the planar support is rotated at high speed for about 1 minute. During this period of rotation excess material is thrown off the disc so that a desired material thickness can be achieved. Most of the fluent material, which is thrown off, is restrained by the first upstanding annular flange 23.

The second upstanding annular flange 24 acts with the groove 25 as a labyrinth seal to stop any material, not held by the first upright flange 23, from reaching the bearing housing 8. The bleed holes 26 act as drains for any material caught between the two flanges.

After the fast spin, the disc is stopped for a period of about 30 minutes to allow the fluent material to settle, after which the pump and heater are switched on and the film is cured. The distributor 31 should be slackened, immediately after the cure has been completed in order to avoid tearing the thin layer. In case of polystyrene the cure takes 3 hours.

The described apparatus may be used for depositing the film of thermoplastic material on the conductive support member described in our United Kingdom Pat. No. 1,373,511.

In an alternative method the first settling period may be carried out with the disc 15 rotating slowly.

The top 18 of the enclosure may be coated with an electrically conductive and optically transmissive substance such as stanus oxide, in order to eliminate the possibility of static charge attracting particles to the undersurface of the lid which subsequently drop on to the disc when charge decay occurs during curing. Alternatively the lid may be made of a polished stainless steel.

We claim:

1. Apparatus for forming a uniform film on a planar surface of a planar support the apparatus comprising a drivable turntable;
    means for removably locating the planar support on the turntable;
    a distributor, mounted for rotation with the turntable for distributing fluent material radially outwardly onto the planar surface of the planar support, the distributor having at least one portion extending axially from the turntable and defining a radially outwardly inclined conical surface for guiding the fluent material towards the planar surface; a housing for enclosing the turntable and the support; dispensing means defining an outlet for delivering a charge of fluent material to the distributor; and means for locating the dispensing means in the housing so that the outlet of the dispensing means is located over the distributor.

2. Apparatus as claimed in claim 1 wherein the housing comprises an optically transmissive top, a base, and a side wall section.

3. Apparatus as claimed in claim 2 further comprising means for causing gaseous material to flow through the housing over the location of the support and means for heating the gaseous material.

4. Apparatus as claimed in claim 3 further comprising a drive spindle means for driving the drivable turntable, the drive spindle means defining a gaseous material inlet passage and wherein the enclosure defines a gaseous material outlet passage, the means for causing gaseous material to flow through the housing including the gaseous material inlet and outlet passages.

5. Apparatus as claimed in claim 3 wherein the means for heating gaseous material comprises a flexible heater tape secured on the outside of the housing.

6. Apparatus for forming a uniform film on a planar surface surface of a planar support, the apparatus comprising: a drivable turntable defining an annular groove in its base;
   means for removably locating the planar support on the turntable;
   a distributor, releasably mounted on the turntable, for distributing fluent material radially outwardly onto the planar surface of the planar support, the distributor having at least one portion extending axially from the turntable and defining a radially outwardly extending conical surface for guiding fluent material towards the planar support; a housing for enclosing the turntable and support, the housing comprising an optically transmissive top, a base, a side wall section, a first upstanding annular flange secured to the base of the housing coaxially with the turntable, and a second upstanding annular flange secured to and arranged to lie within, but not in contact with the annular groove, the base defining a series of bleed holes between the flanges;
   dispensing means, defining an outlet for delivering a charge of fluent material to the distributor; and means for locating the dispensing means in the optically transmissive top coaxially with the turntable.

7. Apparatus as claimed in claim 6 wherein the dispensing means is a filtering syringe.

8. Apparatus as claimed in claim 7 further comprising means for causing gaseous material to flow through the housing over the location of the support and means for heating the gaseous material.

9. Apparatus as claimed in claim 8 further comprising a drive spindle means for driving the drivable turntable, the drive means defining a gaseous material inlet passage and wherein the enclosure defines a gaseous material outlet passage, the means for causing gaseous material to flow through the housing including the gaseous material inlet and outlet passages.

10. Apparatus for forming a uniform film on a planar surface of a planar support the apparatus comprising a drivable turntable;
    means for removably locating the planar support on the turntable;
    a distributor, mounted for rotation with the turntable for distributing fluent material radially outwardly onto the planar surface of the planar support, the distributor including a conical portion which extends axially from the turntable such that the apex of the cone is axially spaced from the turntable;
    a housing for enclosing the turntable and the support;
    dispensing means defining an outlet for delivering a charge of fluent material to the distributor; and means for locating the dispensing means in the housing so that the outlet of the dispensing means is located over the distributor.

11. Apparatus as claimed in claim 10 wherein the distributor is releasably mounted on the turntable and comprises means for restraining the planar support from axial movement away from the turntable when the distributing means is mounted on the turntable.

12. Apparatus as claimed in claim 11 wherein the dispensing means is a filtering syringe.

13. Apparatus for forming a uniform film on a planar surface of a planar support the apparatus comprising a drivable turntable;
    means for removably locating the planar support on the turntable;
    a distributor, mounted for rotation with the turntable for distributing fluent material radially outwardly onto the planar surface of the planar support, the distributor including a portion which extends axially from the turntable and which is formed with a frusto-conical face and a central reservoir for receiving a charge of fluent material;
    a housing for enclosing the turntable and support;
    dispensing means defining an outlet for delivering a charge of fluent material to the distributor; and means for locating the dispensing means in the housing so that the outlet of the dispensing means is located over the distributor.

14. Apparatus for forming a uniform film on a planar surface of a planar support, the apparatus comprising a drivable turntable defining an annular groove in its base; means for removably locating the planar support on the turntable;
    a distributor, releasably mounted on the turntable, for distributing fluent material radially outwardly onto the planar surface of the planar support, the distributor including a conical portion which extends axially from the turntable such that the apex of the cone is axially spaced from the turntable;
    a housing for enclosing the turntable and support, the housing comprising an optically transmissive top, a base, a side wall section, a first upstanding annular flange secured to the base of the housing, coaxially with the turntable, and a second upstanding annular flange secured to and arranged to lie within, but not in contact with the annular groove, the base defining a series of bleed holes between the flanges;
    dispensing means, defining an outlet for delivering a charge of fluent material to the distributor; and means for locating the dispensing means in the optically transmissive top coaxially with the turntable.

15. Apparatus for forming a uniform film on a planar surface of a planar support, the apparatus comprising:
    a drivable turntable defining an annular groove in its base; means for removeably locating the planar support on the turntable;
    a distributor, releasably mounted on the turntable, for distributing fluent material radially outwardly onto the planar surface of the planar support, the distributor including a portion which extends axially from the turntable and which is formed with a frusto-conical face and a central reservoir for receiving a charge of fluent material;
    a housing for enclosing the turntable and support, the housing comprising an optically transmissive top, a base, a side wall section, a first upstanding flange secured to the base of the housing coaxially with the turntable, and a second upstanding annular flange secured to and arranged to lie within, but not in contact with the annular groove, the base defining a series of bleed holes between the flanges;
    dispensing means, defining an outlet for delivering a charge of fluent material to the distributor; and means for locating the dispensing means in the optically transmissive top coaxially with the turntable.

* * * * *